United States Patent [19]

Matejka

[11] 3,760,284

[45] Sept. 18, 1973

[54] CIRCUIT ARRANGEMENT FOR TAKING THE MEAN OF SEVERAL INPUT VOLTAGES

[75] Inventor: Edgar Matejka, Singen/Hohentwiehl, Germany

[73] Assignee: Bodenseewerk Geratetechnik GmbH, Uberlingen/Bodensee, Germany

[22] Filed: Sept. 20, 1971

[21] Appl. No.: 181,819

Related U.S. Application Data

[63] Continuation of Ser. No. 175,581, Aug. 27, 1971, abandoned.

[30] Foreign Application Priority Data

Sept. 18, 1970 Germany .................. P 20 46 140.9

[52] U.S. Cl. ................. 328/158, 307/219, 307/237, 307/304, 328/171

[51] Int. Cl. .......................... H03k 5/08, H02h 7/20

[58] Field of Search .................... 307/219, 235, 237, 307/304; 328/117, 171, 137, 154, 158; 340/146.1 BE

[56] References Cited

UNITED STATES PATENTS

| | | | |
|---|---|---|---|
| 3,492,588 | 1/1970 | Woodward, Jr. | 307/219 X |
| 3,521,087 | 7/1970 | Lombardi | 307/237 |
| 3,489,889 | 1/1970 | Escobosa | 244/77 M X |
| 3,369,129 | 2/1968 | Wolterman | 307/237 |
| 3,603,811 | 9/1971 | Day | 307/237 |
| 3,544,778 | 12/1970 | Masters, Jr. | 307/219 X |
| 3,333,180 | 7/1967 | Neu | 307/304 X |
| 3,348,034 | 10/1967 | Jensen | 235/193 |
| 3,567,963 | 2/1971 | Magee | 307/208 X |
| 3,605,728 | 9/1971 | Ogle | 307/237 X |
| 3,656,025 | 4/1972 | Rovetti | 307/237 X |
| 3,448,293 | 6/1969 | Russell | 307/304 X |
| 3,651,340 | 3/1972 | Cliff | 307/304 X |

*Primary Examiner*—John W. Huckert
*Assistant Examiner*—L. N. Anagnos
*Attorney*—Howard H. Darbo et al.

[57] ABSTRACT

A control apparatus has redundant input signals from which an output signal is produced. There is an input for each input signal respectively and a double-pole between the respective input and the common output. Each double-pole defines a predetermined magnitude of signal that it will pass and predetermined resistance below the threshold so as to limit the extent of the voltage step at the output by interference in a respective channel.

4 Claims, 9 Drawing Figures

Patented Sept. 18, 1973 3,760,284

4 Sheets-Sheet 1

INVENTOR:
EDGAR MATEJKA
BY
Darbo, Robertson & Vandenburgh

INVENTOR
EDGAR MATEJKA
BY
Darbo, Robertson &
Vandenburgh

CIRCUIT ARRANGEMENT FOR TAKING THE MEAN OF SEVERAL INPUT VOLTAGES

The present application is a continuation of U.S. application Ser. No. 175,581, now abondoned.

BACKGROUND AND SUMMARY OF THE INVENTION

My prior U.S. Pat. No. 3,697,776 issued Oct. 10, 1972, relates to a circuit arrangement for taking the mean of several input voltages. The input voltages are applied through resistor branches to a common load resistor across which the mean value (the term "mean" being used herein in the sense of an arithmetic mean) output voltage appears. The resistor branches are controlled in dependence on the difference between the output voltage across the load resistor and the respective input voltage of the branch in such a manner that this input voltage will be suppressed if it deviates by more than a given degree from the output voltage. Circuit arrangements of the type indicated are used, in redundant systems, to take a mean from different measuring or control signals, with "out of place" signals being suppressed. The prior patent aims at effecting such a contactlessly suppression of out-of-place input voltages. According to said prior patent, this is achieved in that the resistor branches comprise voltage-dependent double-poles designed with semiconductor elements, whose resistance becomes very great above a voltage threshold. Below this voltage threshold, the resistance value of the individual resistor branches is as small as possible.

The emodiments described in said prior patent involve problems. For example, with a sudden change of one of the input signals (thus, if the voltage across the respective double-pole suddenly exceeds the voltage threshold and therewith this resistor branch is practically switched off) a signal step occurs across the output of the circuit arrangement. This signal step may have an amplitude which will maximally assume the value of the difference of the two remaining intact signals. Such signal steps can have highly undesirable and dangerous consequences, for instance in an automatic pilot.

It is an object of this invention to reduce dangerous signal steps of the described type in a circuit arrangement of the character of said patent.

The invention is based on the discovery that in such circuit arrangements for taking the mean it is necessary to dimension the voltage-dependent double-poles in a specific manner. Accordingly, the said object is solved by using an output voltage threshold ($U_t$) defined by the formula:

$$U_t = (n-1/n)\ \Delta\ U_s$$

where $n$ is the number of inputs, i.e. respectively resistor branches. $\Delta\ U_{os}$ is the tolerance for the maximal occurring output signal step in a single channel if there is an interference in that channel. Obviously for every $\Delta\ U_{os}$ at the output of a channel there is a corresponding $\Delta\ U_{is}$ at the input of the channel (i.e. $\Delta\ U_{os}$ is a function of $\Delta\ U_{is}$). The resistance R of each double-pole has a finite value below the voltage threshold of about $$R = U_t/I_o$$

where $I_o$ is the required maximal output current of the circuit arrangement.

DESCRIPTION OF SPECIFIC EMBODIMENTS

The following disclosure is offered for public dissemination in return for the grant of a patent. Although it is detailed to ensure adequacy and said understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
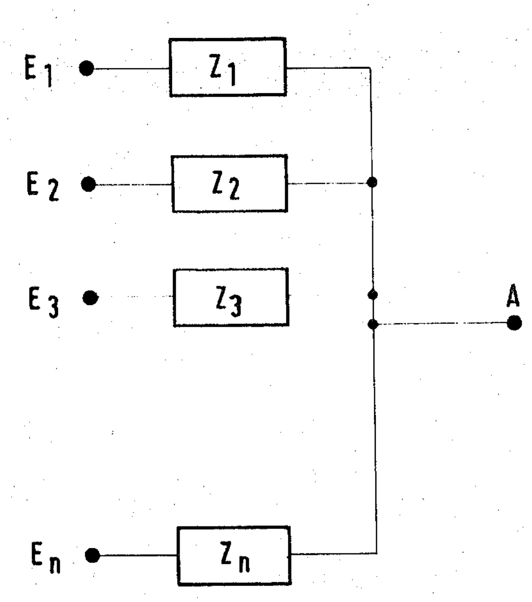
FIG. 1 illustrates the basic circuit used for $n$ input signals.
Figure 2:
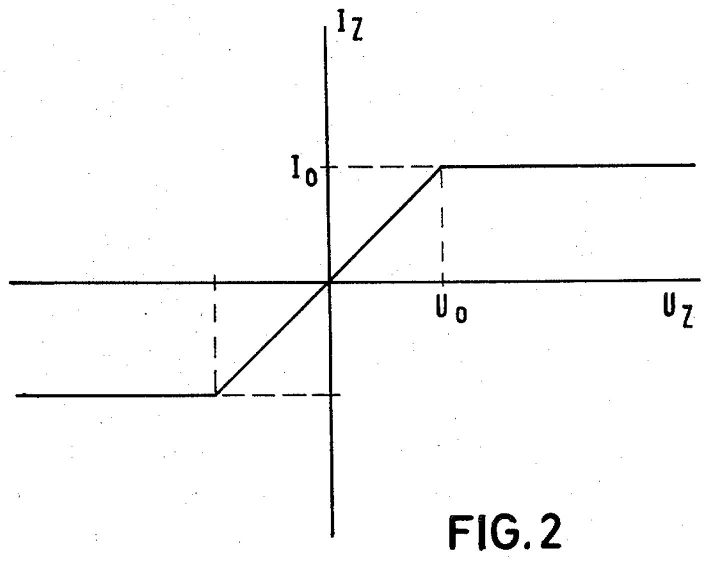
FIG. 2 shows the characteristic of a voltage-dependent double-pole of FIG. 1.

FIG. 1 shows the basic circuit used for $n$ input signals. In this circuit, the input signals $U_1$ to $U_n$ (applied at inputs $E_1$ to $E_n$ respectively) are transmitted to a common output point A through special double-poles $Z_1$ to $Z_n$. In order to permit the illustrated basic circuit to operate functionally correct, the double-poles must have the characteristic illustrated in FIG. 2. The characteristic shows that the double-poles are voltage-dependent. For a voltage $$U_z > U_t$$

applied across the double-pole, the double-pole resistance $R_z$ shall be $$R_z = R.$$

For a voltage $$U_z > U_t$$

applied across the double-pole, however, the current $I_z$ through the double-pole shall be limited to the value $$I_z = I_o.$$

The double-pole characteristic $U_o$ is determined by the maximum permissible step of the output voltage. As mentioned hereinbefore, the maximum step is related to the maximum signal difference between the remaining channels and thus determines a maximum permissible deviation of the input voltages from each other. For the current $I_o$ it applies that it must be greater than the required maximal output current of the circuit arrangement. From this data the resistance $$R = U_t/I_o$$

is calculated.

Figure 3:
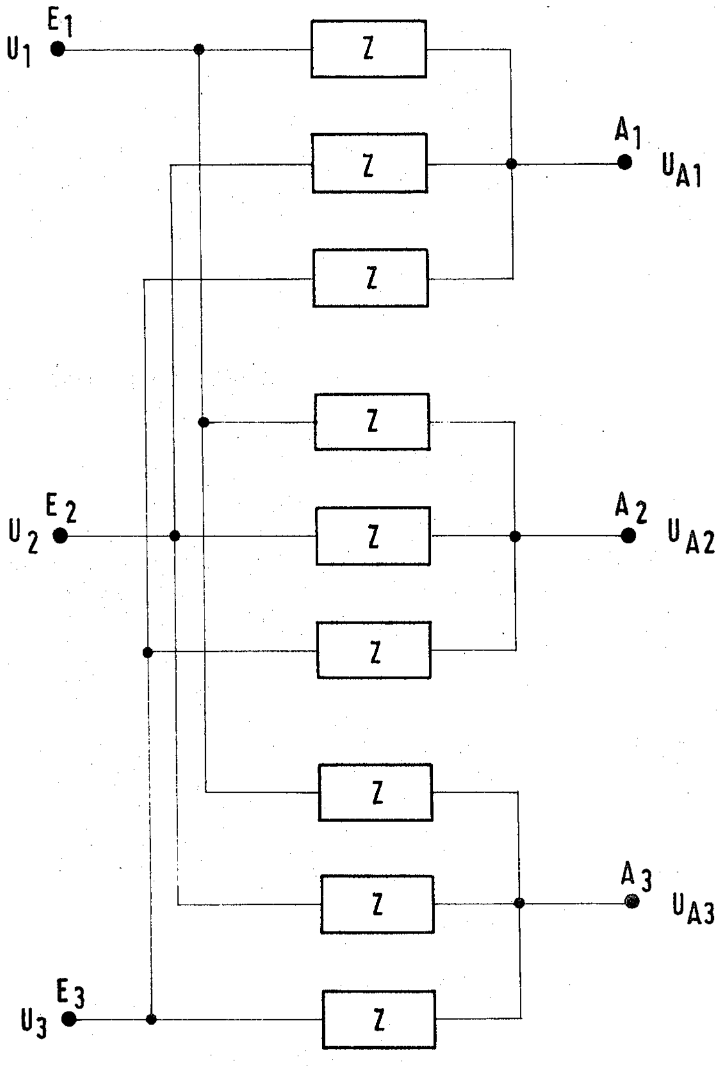
FIG. 3 shows a corresponding circuit arrangement for three input signals and three output signals.

FIG. 3 illustrates a complete circuit arrangement for three input signals $U_1$, $U_2$, $U_3$, for respective output signals $U_{A1}$, $U_{A2}$, $U_{A3}$. In this case the basic circuit illustrated in FIG. 1 and having three inputs $E_1$, $E_2$, $E_3$ is used three times in order to obtain three outputs $A_1$, $A_2$, $A_3$. In the FIGS. 4*a*, 4*b*, and 4*c*, the three output voltages $U_{A1}$, $U_{A2}$, $U_{A3}$ (at outputs $A_1$, $A_2$ and $A_3$ respectively) are illustrated in dependence on the input voltage deviation $\Delta U_1$.

It was previously shown that up to the maximum permissible signal deviation $\Delta U_1$ (input variation) the double-poles have the resistance R. From this condition $U_o$ is obtained. Under the condition illustrated in FIG. 3 where there are three groups: $U_1 = U \pm \Delta U_i$; $U_2 = U_3 = U$ ($U$ being the normal voltage)

$$U_i = \tfrac{2}{3} \Delta U_i.$$

For *n* inputs $$U_i = (n-1/n) \Delta U_i \text{ is obtained}$$

Figure 4A:
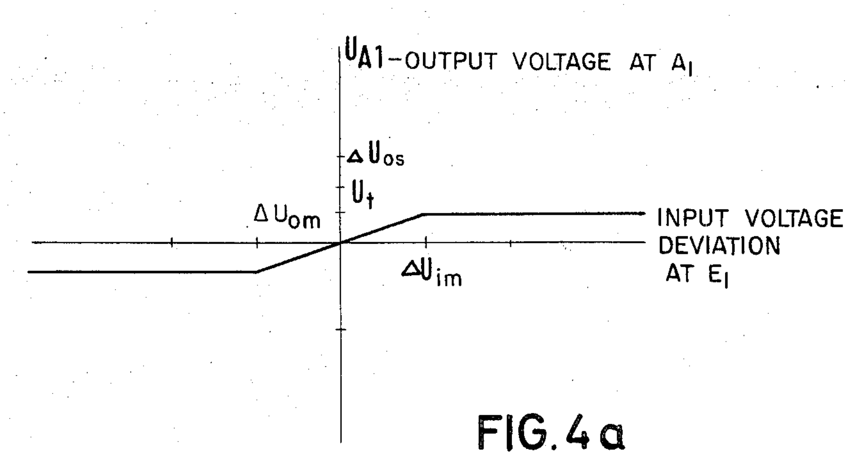
FIGS. 4a to 4c show the output voltages across the three outputs of FIG. 3 in dependence on the deviation of the input voltage across one of the inputs.
Figure 4B:
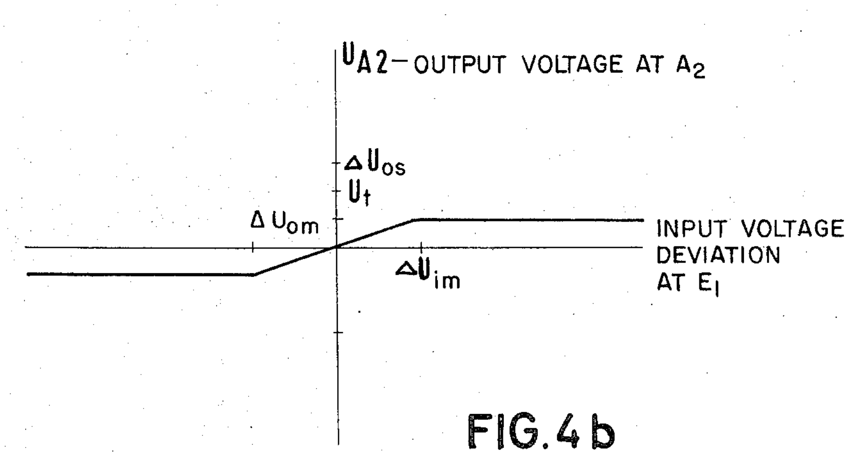
Figure 4C:
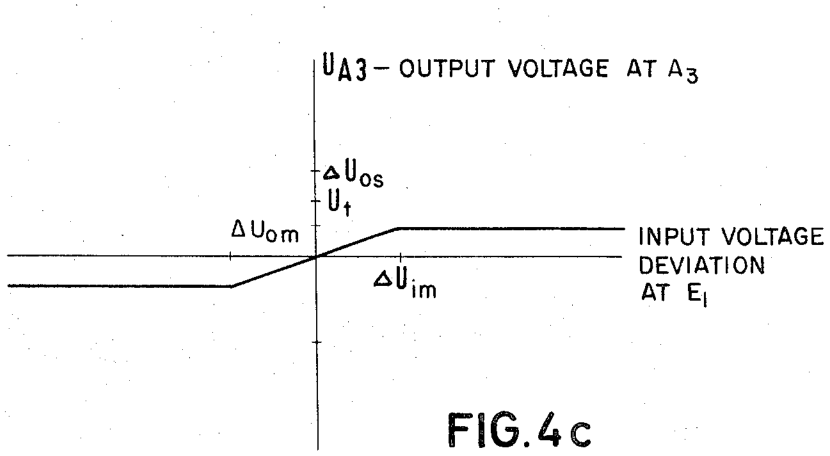

The FIGS. 4*a* to 4*c* illustrate the three output signals as a function of a variation in one of the input signals (e.g. that at $E_1$) and show that the output signals of the circuit arrangement are identical. If the signal deviation exceeds the value $\Delta U_i$ at the input $E_1$, then the output signals $U_{A1}$, $U_{A2}$, and $U_{A3}$ will no longer be influenced by it. The maximal signal deviation at the outputs $A_1$, $A_2$, $A_3$ based on the signal deviation at the input is $\Delta U_{os}/3$ or $\Delta U_{om}$; $\Delta U_{om}$ being the deviation in the output of a multichannel arrangement, i.e. FIG. 3, and is a function of the deviation of the input signal $\Delta U_{im}$ in one channel of that multichannel arrangement. Since $\Delta U_i$ and $\Delta U_o$ are functions of each other and $$U_o = (n-1/n) \Delta U_i$$

it follows that:

$$U_o = (n-1/n) \Delta U_o$$

As the circuit with respect to input and associated output is always designed in the same manner, the identical results are obtained for the other two inputs.

The reflections hereinbefore were made without a load. The permissible load current is maximally $I_o$. It effects an output signal deviation by maximally 0.5 $U_o$ at the outputs.

The following are examples of double-poles:

1. Cold conductors

A cold conductor is a temperature-dependent resistor having very low resistance below the Curie-temperature and a high positive temperature coefficient above the Curie-temperature. The resistance of a cold conductor can be changed by means of the current flowing therethrough. As the change in resistance is effected through the by-pass of temperature, also the ambient temperature influences the break in the characteristic. It is therefore recommended that a stabilization for the ambient temperature be provided. In order that the resistance R of the double-pole can be adjusted in a defined manner, a balancing resistor $R_A$ must be connected in series with the cold conductor.

2. Circuit arrangements with field effect transistors

Figure 5:
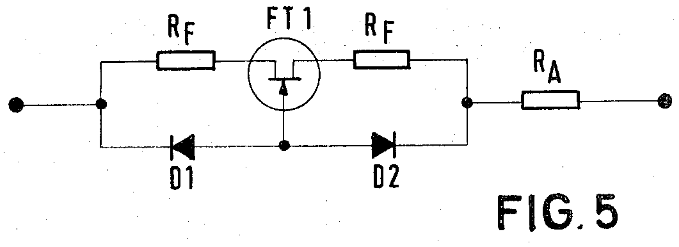
FIG. 5 shows an embodiment of a voltage-dependent double-pole according to this invention.

The circuit illutrated in FIG. 5 employs a symmetrical field effect transistor FT1 as the main component of a voltage-sensitive double-pole such as might be used in each resistor branch Z. The symmetrical field effect transistor has a pair of preceding and succeeding resistors $R_F$. Its gate is connected through diodes $D_1$, $D_2$ with the free end of the resistors. A balancing resistor $R_A$ is in series-connection in this circuit to make up the remainder of the total resistance R. This double-pole circuit also has the necessary characteristic. Herein, the low resistance range is substantially determined by the properties of the field effect transistor FT1. To make up the required resistance R, the balancing resistor $R_A$ is used. The adjustment of the current limitation $I_o$ is accomplished by means of the resistors $R_F$. Advantageously, field effect transistors with low drain-source resistance ($r_{DS\ on}$) and small "pinch-off" voltage are used.

Figure 6:
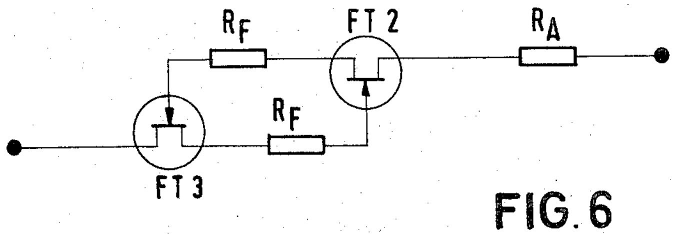
FIG. 6 shows another embodiment of a voltage-dependent double-pole.

Another cirucit including field effect transistors is shown in FIG. 6, in which the double-pole of each resistor branch Z comprises a pair of field effect transistors (FT2, FT3) connected back-to-back (antiparallelly) by resistors $R_F$. The gate of field effect transistor FT3 is connected through a resistor $R_F$ with the source of the transistor FT2 and the gate of the transistor FT2 is connected by a resistor $R_F$ with the drain of transistor FT3. A balancing resistor $R_A$ is arranged in series-connection in this circuit to make up the total resistance R. Herein, the current $I_o$ is adjusted with the resistors $R_F$, the resistance R with the resistor $R_A$.

3. Circuits with operational amplifiers

Figure 7:
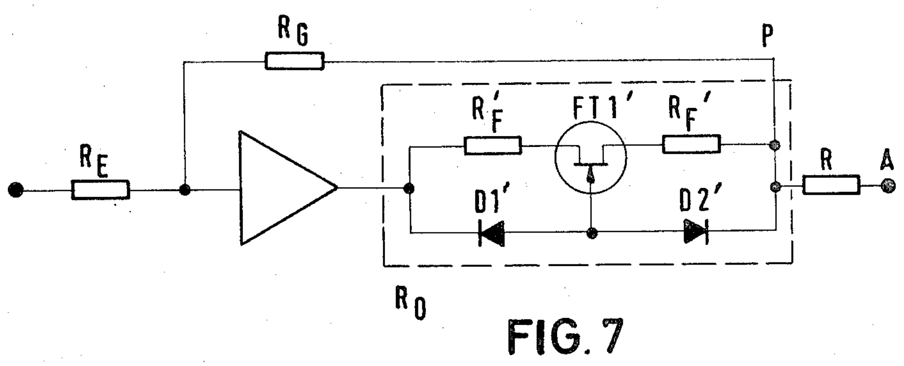
FIG. 7 shows a third embodiment of a voltage-dependent double-pole.

If very accurate values for R and $I_o$ are to be provided the use of four-pole circuits, the transfer characteristic of which corresponds to that of the double-poles, are recommended. In these circuits, operational amplifiers are preferably used. An example for such a circuit to form a resistor branch Z is shown in FIG. 7. Utilizing a field effect transistor double-pole of the type discussed in connection with FIG. 5, its input is connected to the output of an operational amplifier V. The output P of the double-pole is connected to the input of the amplifier by a feedback resistor $R_G$ providing a negative feedback. The branch input E is connected by a resistor to the amplifier input by a resistor $R_E$. The branch output A is connected to P by a resistor $R_A$ which serves to make up the desired total resistance R. The FIG. 5 double-pole (FT1′, $R'_F$, $D'_1$ and $D'_2$) provides current limiting in the series circuit between input E and output A.

Of course, also other circuit arrangements are known which can be used herein to provide current limitation, a condition being that the current limitation is effective in a bipolar manner. The negative feedback of the amplifier according to the current limiting circuit is derived at the point P and is applied via the feedback resistor $R_G$ to the sum point (input) of the amplifier. The input signal U is also applied to the sum point via the input resistor $R_E$. Due to the negative feedback the source impedance is very small and can be neglected, when the amplifier is operated on its characteristic. Then, the source impedance at the output point A of the arrangement is determined only by the resistance $R_A$ which connects the point P with the point A. Therewith, the resistance $R_A$ can be selected in accordance with the requirements of the circuit arrangement of the invention and generally corresponds to the resistance R.

It may also be mentioned that the wiring of the operational amplifier can substantially be selected as desired. Thus, special frequency characteristics also can be achieved.

I claim:

1. In an apparatus for use with a plurality of channels and of the type for forming the mean value of several input voltages from said channels, said apparatus having a plurality of inputs at which said input voltages are applied respectively, an output at which said mean value appears and a plurality of resistor means with each resistor means connecting a respective input with the output, and wherein each resistor means comprises a voltage dependent double-pole whose resistance becomes very great above a threshold, the improvement comprising:

said voltage $U_t$ at said threshold being $$U_t = (n-1/n)\ \Delta\ U_o$$

where $n$ is the number of inputs of respective resistor branches and $U$ is the tolerance for a maximal occurring signal step in said mean value when there is interference in a channel, and the resistance R of each double-pole has a finite value below the voltage at said threshold of about $$R = U_t/I_o$$

where $I_o$ is the required maximal output current at said output.

2. In an apparatus as set forth in claim 1, wherein each double-pole includes:

a symmetrical field effect transistor having three connections a first of which is a gate connection, a diode and a resistor connected in series between the first and a second of the transistor connections with a first juncture therebetween, a diode and a resistor connected in series between the first and third of the transistor connections with a second juncture therebetween, a balancing resistor, said junctures and said balancing resistor being connected in series between the respective input and output of the double-pole.

3. In an apparatus as set forth in claim 2 wherein each resistor means includes an operational amplifier having an input and an output connected in the series circuit between said input and output of the respective resistor means, the amplifier output being connected to the first juncture, a negative feedback circuit including a resistor connecting the second juncture with the amplifier input, and a resistor connecting the amplifier input to the input of the respective resistor means.

4. In an apparatus as set forth in claim 1, wherein each voltage sensitive double-pole includes a pair of field effect transistors connected back-to-back by a pair of resistors and connected in series with a balancing resistor between the input and output of the respective resistor means.

* * * * *

UNITED STATES PATENT OFFICE
CERTIFICATE OF CORRECTION

Patent No. 3,760,284 Dated September 18, 1973

Inventor(s) Edgar Matejka

It is certified that error appears in the above-identified patent and that said Letters Patent are hereby corrected as shown below:

Col. 2, Line 42 " > " should read -- < --
Col. 3, Line 26 After "input" should be inserted --$E_1$--
Col. 4, Line 11 "cirucit" should read --circuit--

Signed and sealed this 21st day of May 1974.

(SEAL)
Attest:

EDWARD M. FLETCHER, JR.
Attesting Officer

C. MARSHALL DANN
Commissioner of Patents

USCOMM-DC 60376-P69
☆ U.S. GOVERNMENT PRINTING OFFICE : 1969 O—366-334.